United States Patent [19]
Chalich

[11] Patent Number: 5,441,679
[45] Date of Patent: Aug. 15, 1995

[54] METHOD OF ASSEMBLING A VALUE HEAD

[75] Inventor: Daniel Chalich, Seminole, Fla.

[73] Assignee: Studor, Inc., Dunedin, Fla.

[21] Appl. No.: 72,031

[22] Filed: Jun. 3, 1993

[51] Int. Cl.⁶ .................. B29C 45/10; B29C 45/14
[52] U.S. Cl. ............................. 264/39; 264/250; 264/274; 264/328.13
[58] Field of Search .............. 264/250, 255, 259, 39, 264/274, 294, 328.13

[56] References Cited

U.S. PATENT DOCUMENTS

| | | | |
|---|---|---|---|
| 2,872,938 | 2/1959 | Hansen et al. | 137/493.9 |
| 2,908,941 | 10/1959 | Sabo et al. | 264/294 |
| 2,928,413 | 3/1960 | Hansen | 137/493.9 |
| 4,040,670 | 8/1977 | Williams | 264/250 X |
| 4,232,706 | 11/1980 | Ericson | 137/375 |
| 4,440,406 | 4/1984 | Ericson | 277/207 A |
| 4,535,807 | 8/1985 | Ericson | 137/533.31 |
| 4,556,084 | 12/1985 | Frawley | 137/526 |
| 4,643,221 | 2/1987 | Parker | 137/516.29 |
| 4,656,315 | 4/1987 | Rathmachers et al. | 264/274 X |
| 4,861,462 | 8/1989 | Lehmann et al. | 209/269 |
| 4,886,085 | 12/1989 | Miller | 137/514 |
| 4,991,623 | 2/1991 | Ericson | 137/526 |

FOREIGN PATENT DOCUMENTS

| | | | |
|---|---|---|---|
| 2307641 | 12/1976 | France | 264/274 |
| 59-37328 | 2/1984 | Japan | 264/250 |

*Primary Examiner*—Jan H. Silbaugh
*Assistant Examiner*—Angela Ortiz
*Attorney, Agent, or Firm*—Herbert W. Larson

[57] ABSTRACT

A valve head includes an annular valving plate made of a resilient material and a valve guide including projecting legs with elongated slots designed to couple with fins located on the valve body to provide valve guidance between open and closed positions. The valving plate and valve guide are assembled together by heating them to a sufficient temperature to permit a thin layer of the guide to melt and fuse with the valving plate.

3 Claims, 3 Drawing Sheets

FIG. 3
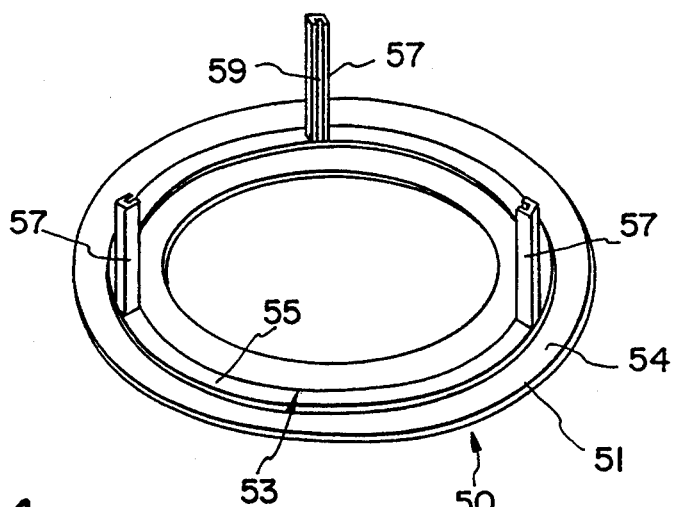
FIG. 4
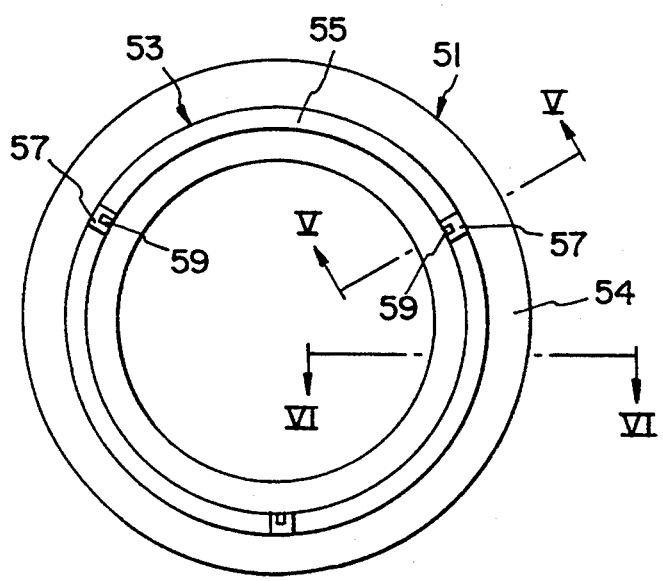
FIG. 5
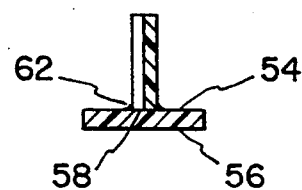
FIG. 6
FIG. 7
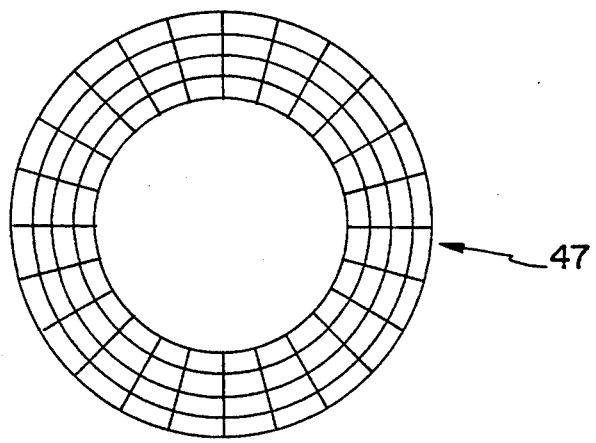

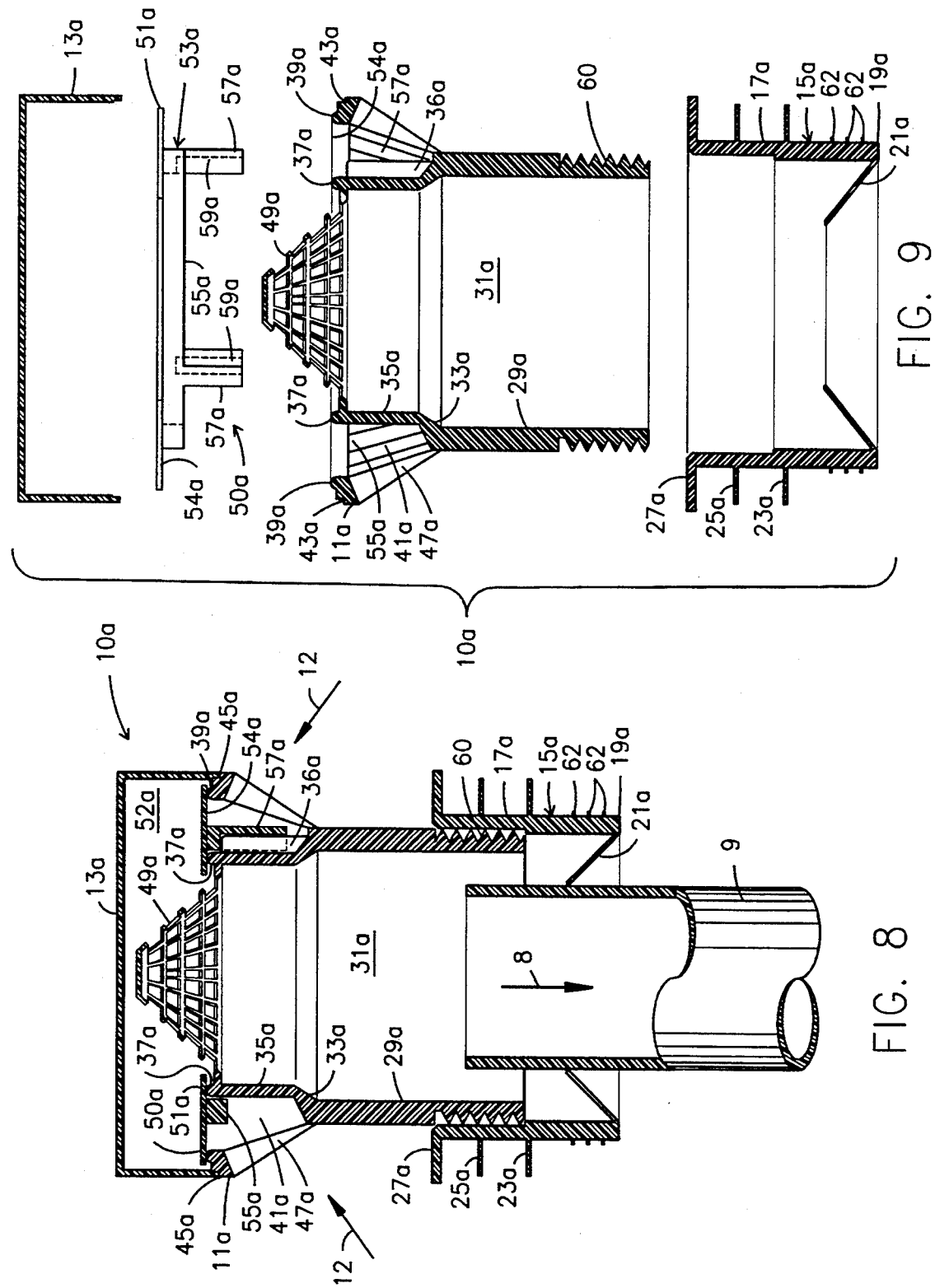

METHOD OF ASSEMBLING A VALUE HEAD

BACKGROUND OF THE INVENTION

The present invention relates to an improved vacuum breaker valve and method of assembly. In the prior art, vacuum breaker valves are known from U.S. Pat. Nos. 4,232,706, 4,440,406, 4,535,807 and 4,991,623. U.S. Pat. No. 4,440,406, discloses devices used for the connection of pipes. No valve structure or method of assembly are disclosed in this patent and, as such, this patent is believed to be of only general interest concerning the teachings of the present invention. However, the other above-listed United States Patents to applicant herein all disclose vacuum breaker valves intended for use in the same environment as disclosed herein.

Of these three patents, U.S. Pat. No. 4,232,706, discloses a valve head having an annular shape of generally triangular cross-section designed to seat on a valve seat consisting of two concentric annuli. This patent fails to disclose any guide means either associated with or connected to the valve head. U.S. Pat. No. 4,991,623, discloses a valve head seating on a valve seat consisting of two concentric annuli. The valve head has a plurality of circumferentially spaced radially outwardly extending lugs slidably received within respective grooves formed within the interior of the cover to guide the valve in vertical movements. The valve head guide structure of this patent is an integral one piece construction.

Finally, U.S. Pat. No. 4,535,807, discloses a valve head described as "a membrane or an annular flap" of undisclosed material and having an annular support attached thereto in a manner undescribed, with the annular support being made "of a plastic material". The plastic support includes guiding lugs having internal grooves designed to cooperate with externally extending ribs molded onto the outside of the valve body. A problem has arisen in the interconnection of the annular flap and annular support in that they are difficult to assemble. In practice, the annular flap and annular support have been interconnected through the use of a suitable adhesive. However, in the humid, corrosive environment of a vacuum breaker valve, this means of interconnection has occasionally proven ineffective and, the annular flap and annular support have separated eliminating the guidance feature of the annular support. This could cause the annular flap to become misaligned with respect to the valve seat much in the manner which may occur with regard to the valve disclosed in prior U.S. Pat. No. 4,232,706. As such, a need has developed for a more effective manner of interconnection between the annular valve flap and the associated annular support. It is the solution to this problem which is the basis for the present patent application.

In addition to the prior United States Patents, above-listed and discussed, applicant is aware of the following prior art U.S. Pat. Nos.:
2,872,938 to Hansen et al.
2,928,413 to Hansen et al.
4,556,084 to Frawley
4,643,221 to Parker
4,861,462 to Lehmann et al.
4,886,085 to Miller.

While each of these patents teaches a valve which is opened responsive to sensing of conditions in the flow line such as reduction of pressure on one side of the valve, none of these references teaches a valve wherein the valve head includes a valving plate connected to a valve guide through the provision of a melting and fusing process.

SUMMARY OF THE INVENTION

The present invention relates to an improved vacuum breaker valve and method of assembly. The present invention includes the following interrelated objects, aspects and features:

(A) The vacuum breaker valve of the present invention is similar in construction to that which is disclosed in prior U.S. Pat. No. 4,535,807, which patent is hereby incorporated by reference. The valve housing includes a central passageway connectable to the vent pipe of a plumbing system and an annular port connectable to atmosphere with the inventive valve head interposed therebetween.

(B) The housing includes two screen devices, including one surrounding the port exposed to the atmosphere and another located to extend through a central opening formed in the valve head, with these screens being provided to prevent passage of vermin such as rodents, or bugs, or debris.

(C) The valve seat consists of two concentric generally circular upstanding beads which define between them the inlet port connected to the atmosphere. The valve plate itself consists of a generally circular annulus or ring made of a material such as a soft elastomer, silicone elastomer, soft vinyl or urethane and sized to cover the ring-like port formed between the above-described generally circular beads.

(D) The valving plate has an upper surface facing away from the valve seat and a lower seat engaging surface overlying the valve seat. The lower surface has affixed thereto a valve guide consisting of a hard plastic ring having a plurality of downwardly depending guide lugs, each one of which has an internally facing slot therein. The outer wall of the support structure of the valve body for the inner seat bead has a corresponding plurality of outwardly extending fins sized to enter the slots of the guide lugs so as to firmly and smoothly guide the valving plate in its upward and downward movements away from and toward the valve seat, respectively.

(E) The heart of the present invention consists of the specific manner of assembly of the valving plate to the valve guide. As pointed out in the Background of The Invention, use of adhesives to hold the valving plate and valve guide together has occasionally resulted in adhesive breakdown in the humid, corrosive environment in the plumbing system. Furthermore, other means of attachment such as, for example, bolts are equally ineffective as providing locations where corrosion and failure of the valve may take place. Thus, in the present invention, applicant has discovered a method of assembling the valving plate to the valve guide which is inexpensive, highly effective, reliable, reproducible and exact in position.

(F) The inventive method of assembly consists of molding the valve guide from a material such as, for example, glass-filled polypropylene, or ABS. The surface of the mold engaging the top surface of the valve guide is sand blasted to provide a rough top surface for the valve guide. The molded guide is then removed from its mold and placed in another mold where the valving plate, made of a thermoplastic soft elastomer, silicone elastomer, a soft vinyl or urethane material is injection molded and engaged or attached to the top surface of the valve guide. The valve guide and the elastomer forming the valving plate are heated together in the mold to a temperature of over 400 degrees F at 12,000 to 15,000 psi so that a thin layer on the top surface of the guide engaging the valving plate is melted and fuses with the engaging surface of the valving plate so that when the combined valving plate and valve guide are subsequently cooled, a one piece structure results.

As such, it is a first object to the present invention to provide an improved vacuum breaker valve and method of assembly.

It is a further object of the present invention to provide such a method including heat fusing of the valving plate to the valve guide.

It is a still further object of the present invention to provide such a device wherein the valving plate is made of a soft material such as soft vinyl or a thermoplastic elastomer such as DYNAFLEX® sold by SHELL CHEMICAL CO.

It is a still further object of the present invention to provide such a method, wherein the valving plate and valve guide are engaged together and heated to a temperature high enough to cause the valve guide to begin to melt, thereby causing fusing of the interengaging portions of the valving plate and valve guide.

These and other objects, aspects and feature of the present invention will be better understood from the following detailed description of the preferred embodiment when read in conjunction with the appended drawing figures.

BRIEF DESCRIPTION OF THE DRAWINGS

FIG. 3 shows a perspective view of the valving plate of the present invention.

FIG. 4 shows a view looking downwardly with respect to the view of FIG. 3.

FIG. 5 shows a cross-sectional view along the line V—V of FIG. 4.

FIG. 6 shows a cross-sectional view along the line VI—VI of FIG. 4.

FIG. 7 shows a bottom view of a screen device used to prevent entry of debris or vermin into the associated vent pipe.

FIG. 8 shows a cross-sectional view of an alternate vacuum breaker valve.

FIG. 9 shows an exploded cross-sectional view of the valve of FIG. 8.

SPECIFIC DESCRIPTION OF THE PREFERRED EMBODIMENT

Figure 1:
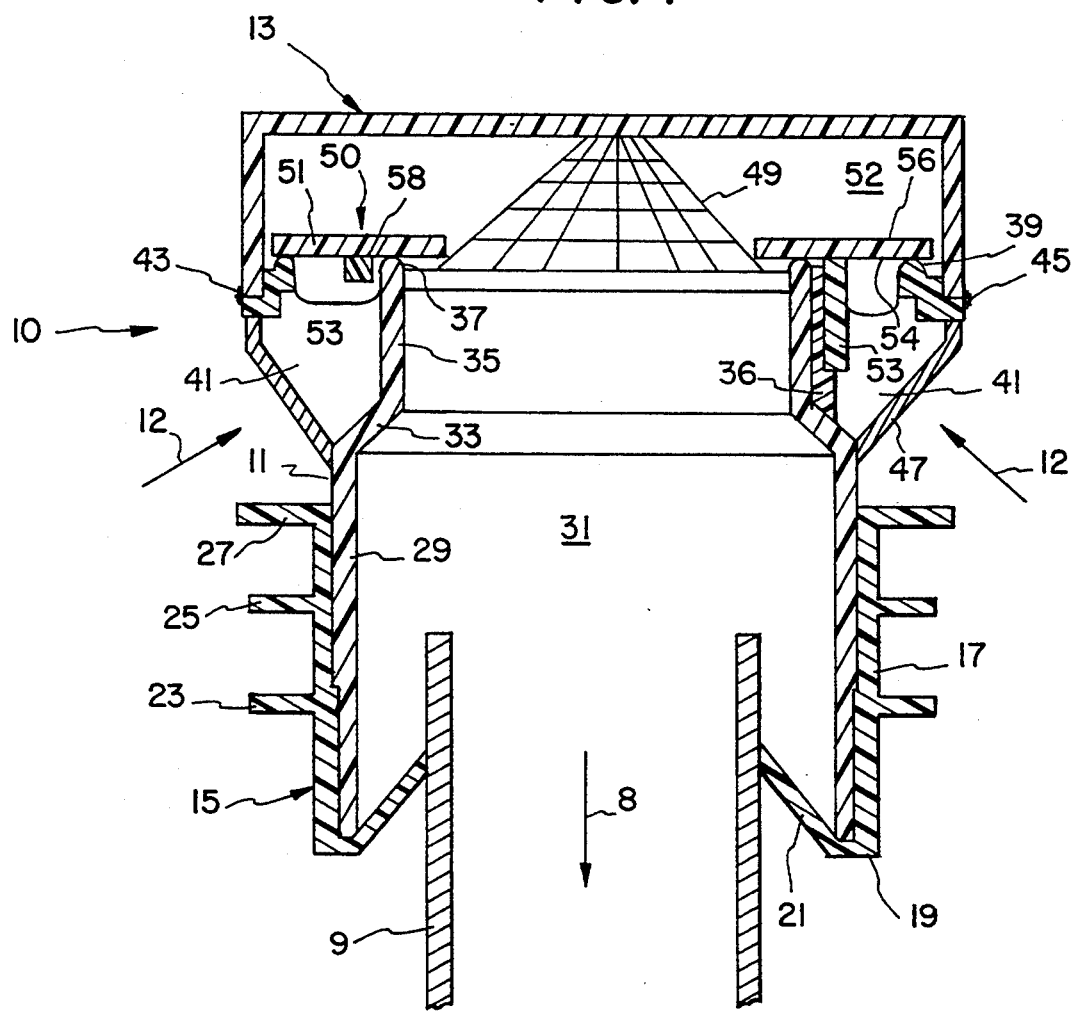
FIG. 1 shows a cross-sectional view of a vacuum breaker valve in accordance with the teachings of the present invention.

While the heart of the present invention consists of the method of assembling a valving plate to the valve guide, it is believed instructive to describe, in great detail, the preferred environment of use of the inventive valve so assembled. In this regard, attention is first directed to FIGS. 1 and 2 wherein a valve assembly is generally designated by the reference numeral 10 and is seen to include a valve body 11, a cover 13 and a coupling member 15.

The coupling member 15 includes a generally cylindrical outer wall 17 having a bottom termination 19 including an upwardly extending generally frusto-conical portion 21 which may be flexed inwardly or outwardly from the position shown in FIG. 1 to accommodate to vent pipes of varying sizes. In FIGS. 1 and 8, the vent pipe is generally designated by the reference numeral 9 and, as should be understood, is interconnected into a plumbing system of a home or building. The coupling member 15 also includes outwardly extending ring-like projections 23, 25 and 27 which are designed to facilitate coupling of the valve assembly 10 within a vent pipe rather than in surrounding relation thereto as shown in FIG. 1. Thus, the coupling member 15 provides versatility in allowing the inventive valve assembly 10 to be coupled either within or in surrounding relation to a vent pipe of a plumbing system.

Figure 2:
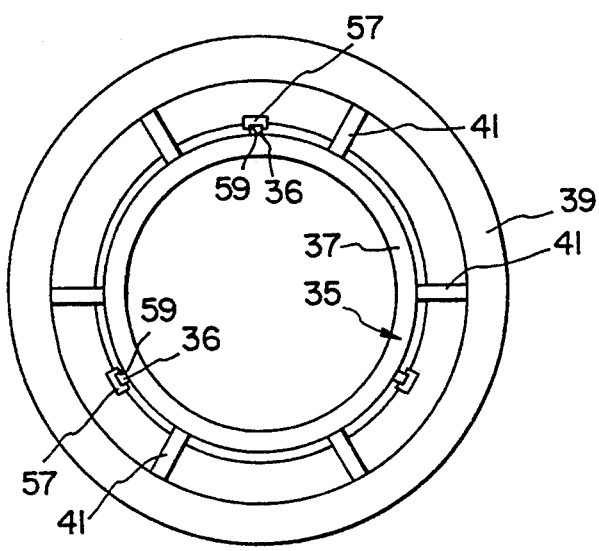
FIG. 2 shows a view looking downwardly onto the valve seat of the valve housing of the present invention, also showing the relationship between the valve guide and outwardly extending housing guide ribs.

As shown, in FIG. 1, the coupling member 15 is mounted in surrounding relation to a generally cylindrical portion 29 of the housing 11 which portion 29 contains a chamber 31 intended, as shown, to be fluidly coupled to the vent pipe 9. The portion 29 extends upwardly including a generally frusto-conical inward taper 33 and a further generally cylindrical portion 35 terminating, upwardly, in an inner annular valve seam 37 which comprises a generally circular annulus having an arcuately shaped bead-like configuration. An outer annular valve seat 39 is also provided in the valve housing 11 supported in outwardly spaced configuration with respect to the inner annular valve seat 37 by a series of fins 41 as seen in FIGS. 1 and 2. As best shown in FIG. 2, in the preferred embodiment of the present invention, six support fins 41 are provided. Of course, any number of support fins 41 may be provided so long as proper support for the outer annular valve seat 39 is provided.

As shown in FIG. 1, the support structure of the housing 11 immediately outwardly adjacent to the outer annular valve seat 39 includes a shoulder 43 which is designed to allow firm support for the cover 13. The bead 45 is formed by sonically welding the cover 13 in assembled relation over the shoulder 43 of the housing 11 in the position shown in FIG. 1. An O-ring can be used in larger versions of the breaker valve between the cover and shoulder 43.

Screens 47 and 49 are provided at the locations shown to prevent passage of vermin such as rodents, bugs, or debris. Any suitable attachment means may be employed to hold the screens 47 and 49 in their assembled locations as particularly shown in FIG. 1. As should be understood from FIGS. 1 and 7, the screens 47 and 49 have extremely large openings large enough to allow unrestricted air flow through the valve housing 11 while being small enough to prevent passage of large debris, rodents or other vermin.

The valve head of the present invention is generally designated by the reference numeral 50 and is seen to include a valving plate 51 and a valve guide 53. With particular reference to FIG. 3, it is seen that the valving plate 51 comprises an annular ring-like device and, in the preferred embodiment of the present invention, is made of a soft resilient flexible material such as, for example, soft vinyl or soft urethane. It is most preferred that this material be a soft elastomer such as DYNAFLEX® by SHELL CHEMICAL CO. The valve guide 53 is made of a hard plastic such as, for example, glass-filled polypropylene or a copolymer of acrylonitrile, butadiene, styrene. It includes a ring 55 engaging the surface 54 of the valving plate 51 and a plurality of lugs 57 extending upwardly with respect to the ring 55 in the view shown in FIG. 3, although, in practice, the valve head 50 is oriented upside down with respect to the view of FIG. 3 as should be clearly understood from FIG. 1. The orientation shown in FIG. 3 is merely provided for clarity in understanding the particular structure of the valve head 50. Variations of the valve guide 53 can have one or more lugs 57.

With reference to FIGS. 2 and 4, it should be understood that each guide lug 57 had an inwardly directed slot 59 designed to be slidably received on exterior surfaces of guiding ribs 36 formed on the exterior walls of the cylindrical portion 35 of the valve housing 11. This relationship is best shown in FIG. 2.

In the operation of the valve assembly 10, the coupling member 15 is utilized to couple the valve assembly 10 over the vent pipe 9 of a plumbing system. When a toilet is flushed in the plumbing system, this causes a suction in the direction of the arrow 8 and a reduction of pressure within the chamber 52 above the valving plate 51 so that the valving plate 51 is exposed to atmospheric pressure on its surface 54 and less than atmospheric pressure on its surface 56. This pressure differential causes the valving plate 51 to elevate with respect to its position as shown in FIG. 1 allowing atmospheric air to enter in the direction of the arrows 12 and to flow in the direction of the arrow 8 until such time as the pressure within the vent pipe 9 is equal to atmospheric pressure, whereupon the pressures on the surfaces 54 and 56 of the valving plate equalize and gravity causes the valving plate 51 to resume its position as shown in FIG. 1.

As pointed out above, the heart of the present invention consists of the actual method of assembling the valve head 50. In assembling the valve head 50, first the valve guide 53 is separately manufactured. The valve guide 53 is molded in any suitable manner of a hard plastic material such as, for example, glass-filled polypropylene, or a copolymer of acrylonitrile, butadiene, styrene (ABS). The surface of the mold in contact with the top surface 58 of the valve guide 53 is sand blasted. Thereafter, the valve guide 53 is placed in another mold and a soft elastomer such as DYNAFLEX® is injection molded to form in the mold the soft valving plate 51. The surface 54 of the valving plate 51 is engaged with the top surface 58 of the valve guide 53. The top surface 58 of the valve guide is roughened because of contact with a sand blasted portion of its mold. The rough top surface 58 enhances fusion between such surface 58 and valving plate 51. The second mold used to form the valving plate 51 and simultaneously fuse it to surface 58 should have a top surface sand blasted or treated with a mold release agent to enhance release of the valve head 50 from the mold without deforming the valving plate 51. In this orientation, the valve guide 53 and valving plate 51 are heated to a temperature in excess of 400 degrees F and at a pressure of 12,000 to 15,000 psi until such time as a thin layer of the surface 58 of the valve guide 53 melts and thereby fuses with the surface 54 of the valving plate 51 at 62 (FIG. 5). When this melting and fusing has taken place, the assembled valve head 50 is allowed to cool resulting in the valve head 50 as used in accordance with the teachings of the present invention. Through assembly using this method, the valving plate 51 is maintained in permanent interconnection with the valve guide 53 regardless of the corrosive nature of the environment in which the valve head 50 operates or the degree of humidity thereof. This method of assembly of the valve head 50 has proven to be far superior to any other methods known to applicant including use of adhesives, bolting or other means of connection.

In an alternate embodiment of the valve assembly 10a, as shown in FIGS. 8 and 9, screen 49a is integral with the cylindrical portion 35a of the valve housing 11a. The valve head 50a containing plate 51a and valve guide 53a molded together as set forth above for components 51 and 53, drops over the screen 49a and legs 57a seat within guiding ribs 36a. The valve housing 11a has a cylindrical portion 29a with threads 60 on a lower outer portion thereof. An inward taper 33a leads to cylindrical portion 35a terminating in valve seat 37a. The cover 13a is sonically welded to shoulder 43a of housing 11a. A screen 47a opens into a cavity 31a and fins 41a support the outer valve seat 39a.

A coupling member 15a has ring-like projections 23a, 25a and 27a, together with three concentric rings 62. Pipe 9 is held in place by frusto-conical portion 21a of the coupling member 15a.

As such, an invention has been disclosed in terms of an improved vacuum breaker valve and its method of assembly which fulfills each and every one of the objects of the invention as set forth hereinabove and provides a new and useful invention of great novelty and utility.

Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. A method of assembling a valve head including a valving plate and valve guide, including the steps of:
   (a) molding said valve guide from a plastic material in a first mold and providing said first mold with a sand blasted surface juxtaposed to a top surface of the molded valve guide whereby said top surface is formed with a roughened surface;
   (b) placing the molded valve guide in a second mold capable of receiving a soft elastomer;
   (c) injection molding in said second mold said valving plate from the soft elastomer and simultaneously engaging said roughened top surface of said valve guide to a surface of the valving plate;
   (d) heating together in said second mold said valve guide and said valving plate to a temperature of over 400 degrees F. while pressing said valve guide and valving plate together at 12,000 to 15,000 psi, thereby causing a portion of said valve guide in engagement with said valving plate to soften so that said top surface of said valve guide is fused to said valving plate, said roughened top surface of said valve guide enhancing fusion between said top surface and said valving plate; and
   (e) cooling said guide as fused to said valving plate.

2. The method of claim 1, wherein said molding of said valve guide comprises molding said valve guide from a copolymer of acrylonitrile, butadiene, and styrene.

3. The method of claim 1, wherein a surface of said second mold is sand blasted prior to receiving said soft elastomer to enhance release from said second mold without deforming said valving plate.

* * * * *